(12) United States Patent
Rateiczak et al.

(10) Patent No.: US 10,770,806 B2
(45) Date of Patent: *Sep. 8, 2020

(54) ELECTRICAL CONTACT COMPOSITES AND METHOD FOR PRODUCING ELECTRICAL CONTACT COMPOSITES

(71) Applicant: SAINT-GOBAIN GLASS FRANCE, Courbevoie (FR)

(72) Inventors: Mitja Rateiczak, Wuerselen (DE); Bernhard Reul, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 172 days.

This patent is subject to a terminal disclaimer.

(21) Appl. No.: 15/799,767

(22) Filed: Oct. 31, 2017

(65) Prior Publication Data

US 2018/0062279 A1 Mar. 1, 2018

Related U.S. Application Data

(63) Continuation of application No. 14/237,456, filed as application No. PCT/EP2012/064992 on Aug. 1, 2012, now Pat. No. 9,837,732.

(30) Foreign Application Priority Data

Aug. 9, 2011 (EP) ..................................... 11176894

(51) Int. Cl.
*B32B 17/10* (2006.01)
*H01R 4/58* (2006.01)
(Continued)

(52) U.S. Cl.
CPC ............ *H01R 4/58* (2013.01); *B32B 17/1022* (2013.01); *B32B 17/10174* (2013.01);
(Continued)

(58) Field of Classification Search
CPC .................................................. B32B 17/1022
See application file for complete search history.

(56) References Cited

U.S. PATENT DOCUMENTS

| 5,249,100 A | 9/1993 | Satoh et al. |
| 6,045,896 A | 4/2000 | Boire et al. |
| (Continued) | | |

FOREIGN PATENT DOCUMENTS

| CN | 201915043 U | 8/2011 | |
| DE | 3919974 A1 * | 12/1989 | ............... H05B 3/84 |
| (Continued) | | | |

OTHER PUBLICATIONS

English translation of DE3919974, EPO, Captured Dec. 30, 2019 (Year: 2019).*

*Primary Examiner* — Adam Krupicka
(74) *Attorney, Agent, or Firm* — Pillsbury Winthrop Shaw Pittman LLP

(57) ABSTRACT

An electrical contact composite is described. The electrical contact composite has a substrate and an electrically conductive coating applied to the substrate, which coating is connected to an electrode. A metal contact element is connected to the electrode, which contact element is used to connect the conductive coating to a current/voltage source. Furthermore, at least one sprayed layer produced by means of a thermal spraying method, in particular gas dynamic cold spray, and is provided with at least one metal and/or metal alloy, the sprayed layer being arranged between the conductive coating and the contact element. The sprayed layer has a coefficient of thermal expansion that is between the coefficients of thermal expansion of the carrier and of the contact element. The sprayed layer can also be used as the electrode for the conductive coating.

6 Claims, 1 Drawing Sheet

(51) Int. Cl.
    *H05B 3/84* (2006.01)
    *C23C 24/04* (2006.01)
    *C23C 4/06* (2016.01)
    *H01R 4/04* (2006.01)

(52) U.S. Cl.
    CPC ............... *C23C 4/06* (2013.01); *C23C 24/04* (2013.01); *H05B 3/84* (2013.01); *H01R 4/04* (2013.01); *H05B 2203/016* (2013.01); *Y10T 428/12493* (2015.01)

(56) References Cited

U.S. PATENT DOCUMENTS

| | | |
|---|---|---|
| 6,195,495 B1 | 2/2001 | Ota et al. |
| 9,837,732 B2 | 12/2017 | Rateiczak et al. |
| 2006/0068220 A1 | 3/2006 | Takei et al. |
| 2009/0154872 A1 | 6/2009 | Sherrer et al. |
| 2009/0272417 A1 | 11/2009 | Schulz-Harder |
| 2009/0315169 A1 | 12/2009 | Weekamp |
| 2011/0108537 A1 | 5/2011 | Schall |
| 2012/0080421 A1 | 4/2012 | Macher et al. |

FOREIGN PATENT DOCUMENTS

| | | |
|---|---|---|
| DE | 19747386 A1 | 4/1999 |
| DE | 10037212 A1 | 1/2002 |
| DE | 10259110 B3 | 7/2004 |
| DE | 10-2004-018109 B3 | 6/2005 |
| DE | 10-2008-018147 A1 | 10/2009 |
| DE | 10-2008-029986 A1 | 1/2010 |
| DE | 20-2008-017611 U1 | 4/2010 |
| EP | 0 847 965 B1 | 10/2004 |
| EP | 2 278 851 A1 | 1/2011 |
| JP | H02-9433 B2 | 3/1990 |
| JP | H05-299155 A | 11/1993 |
| JP | 2010-034238 A | 2/2010 |
| JP | 2012-009433 A | 1/2012 |

\* cited by examiner

ELECTRICAL CONTACT COMPOSITES AND METHOD FOR PRODUCING ELECTRICAL CONTACT COMPOSITES

CROSS REFERENCE TO RELATED APPLICATIONS

The present application is a Continuation application Ser. No. 14/237,456 filed on Mar. 24, 2014 which in turn claims priority US National Stage of International Patent Application PCT/EP2012/064992 filed on Aug. 1, 2012 which, in turn, claims priority to European Patent Application EP 11176894.1 filed on Aug. 9, 2011, all of which are incorporated herein by reference in their entirety.

BACKGROUND

The invention is in the technical area of the production of flat electrical structures with a substrate and an electrically conductive coating applied thereon and relates to the electrical contact composite of flat electrical structures as well as methods for producing electrical contact composites.

Flat electrical structures with a substrate of an electrically insulating material and an electrically conductive coating applied thereon are sufficiently known per se. They are frequently used as transparent or opaque panel heating elements, in particular in the form of heatable glazings. Examples of this include heatable windshields, rear windows, glass roofs, or side windows in motor vehicles or wall-mounted or freestanding heating elements in living spaces, which serve to heat the living spaces. However, they can likewise also be used as heatable mirrors or transparent decorative elements. An alternative use of the conductive coating is as a planar antenna for receiving electromagnetic radiation. Flat electrical structures have already been described many times in the patent literature. Merely by way of example, reference is made in this regard to the patent applications DE 102008018147 A1, DE 102008029986 A1, DE 10259110 B3, and DE 102004018109 B3.

As a rule, the electrically conductive coating is electrically connected to at least one electrode. Thus, generally, a single electrode serves in planar antennas for the coupling of electrical signals out of the conductive coating. In panel heating elements, the conductive coating is typically electrically connected to at least one pair of strip- or band-shaped electrodes (bus bars), which are intended to introduce the heating current as uniformly as possible into the conductive coating and to distribute it broadly.

It is customary, in a flat electrical structure, to electrically connect the at least one electrode to a metal contact element to form an electrical contact composite, for example, to connect the conductive coating to downstream antenna electronics (e.g., amplifier circuit) or to the two terminals of a current/voltage source making the heating current available.

It has been demonstrated in practice that such a contact composite is subject to high wear and can break, which may even be accompanied by substrate breakage (e.g., glass breakage). Since this results in a complete functional failure of the panel heating element, which always requires repair by service personnel, it is desirable to implement the contact composite in as stable a manner as possible. However, this undesirably increases production costs.

SUMMARY OF INVENTION

In contrast, the object of the present invention consists in making available an electrical contact composite of a flat electrical structure having improved mechanical stability. This and other objects are accomplished according to the proposal of the invention by electrical contact composites as well as methods for producing electrical contact composites with the characteristics of the coordinated claims. Advantageous embodiments of the invention are indicated by the characteristics of the subclaims.

According to the invention, a first electrical contact composite of a flat electrical structure, for example, a panel heating element, in particular a heatable glazing, or a planar antenna, is presented. The contact composite comprises a flat substrate made, for example, of glass or plastic and an electrically conductive coating applied thereon, which is electrically connected to an electrode.

Furthermore, a metal contact element connected to the electrode is arranged, which contact element is provided for the electrical connection of the conductive coating to an electrical device, for example, an electronic circuit for processing antenna signals or a terminal of a current/voltage source. In particular, with a glass substrate, the material of the metal contact element typically has a coefficient of thermal expansion that is greater than the coefficient of thermal expansion of glass. The contact composite further comprises at least one electrically conductive sprayed layer produced by a thermal spraying method, preferably cold gas spraying. Here and in the following, the term "thermal spraying method" means a coating method in which a particle stream, by means of which the sprayed layer is formed, is aimed with high energy at a target, by means of which adhesion is effected between the particles and the material of the target. Especially in the case of cold gas spraying, the particles are, in fact, heated to generate the gas beam, but, as a rule, not all the way to to the melting point, such that the gas is relatively "cold". Such spraying methods, in particular cold gas spraying (cold spraying) are well known to the person skilled in the art such that is unnecessary to make more detailed statements here. They are described in the patent literature, for example, in the German published patent applications DE 19747386 A1 and DE 10037212 A1.

In the contact composite according to the invention, the sprayed layer comprises at least one metal and/or at least one metal alloy and is arranged between the conductive coating and the contact element. Here, it is essential that the material of the sprayed layer have a coefficient of thermal expansion that is between the coefficient of thermal expansion of the materials of the carrier and the contact element.

In practice, flat electrical structures, such as panel heating elements and planar antennas, are often subjected to relatively large temperature fluctuations, which can, for example, be in the range from −40° C. to 120° C., such that the materials used for compact composite are subject to correspondingly large volume changes. As the applicant has discerned, an extremely great difference in the thermally-induced volume changes occurs, as a rule, between the substrate for the conductive coating and the metal contact element. In this respect, the possibility exists that large temperature changes cause thermal stresses that possibly favor the occurrence of a break in the contact composite.

In contrast to this, a reduction in the difference in the coefficients of thermal expansions of adjacent components of the contact composite can be advantageously achieved in the contact composite according to the invention by means of the sprayed layer that is arranged between the substrate and the contact element. The occurrence of thermal stresses can thus be very effectively counteracted, with the danger of breakage of the contact composite significantly reduced.

In principle, the sprayed layer can have any coefficient of thermal expansion as long as it is guaranteed to be between that of the substrate and the contact element in order to obtain the advantageous effect of a reduction in thermally-induced stresses. In an embodiment of the contact composite according to the invention particularly advantageous from the standpoint of the reduction in thermally-induced stresses, the coefficient of thermal expansion of the sprayed layer is in the range of a middle third of a value interval of coefficients of thermal expansion bounded by the coefficients of thermal expansion of the substrate and the contact element, by which means a particularly effective reduction of thermal stresses can be obtained. In particular, the coefficient of thermal expansion of the sprayed layer can correspond, at least approx., to a mean formed from the coefficients of thermal expansion of the substrate and the contact element in order to obtain an optimum effect. In the case of a glass substrate and a metal contact element, it can be advantageous, for this purpose, for the coefficient of thermal expansion of the sprayed layer to be in the range from 7 to $17(\times 10^{-6} \text{ K}^{-1})$, preferably in the range from 12 to $13(\times 10^{-6} \text{ K}^{-1})$.

In an advantageous embodiment of the contact composite according to the invention, the sprayed layer is sprayed directly onto the electrode. As experiments of the applicant have shown, by means of bombardment with the particles, an oxide and/or corrosion layer possibly present on the electrode can be damaged such that a particularly strong (direct) connection between the materials of the sprayed layer and the electrode can form. In particular, through relatively high particle speeds as well as high ductility of the bombardment material used, a roughening of the surface of the electrode can be effected, possibly even creating undercuts. In connection with a reduction of the thermal stresses in the contact composite by means of a suitably selected coefficient of thermal expansion of the sprayed layer, it is possible in this manner to produce a particularly stable, low-wear contact composite.

Alternatively, it is also possible to spray the sprayed layer directly onto the electrically conductive coating, with, in this case, a particularly good adhesion of the sprayed layer on the conductive coating obtainable. As the person skilled in the art knows, the electrically conductive coating has, due to the smooth surface of the substrate, an equally smooth surface. When the sprayed layer is applied on the electrically conductive coating, a stronger bonding can be achieved between the (rougher or coarser) sprayed layer and the electrically conductive coating than with the application of the electrode on the electrically conductive coating, for example, in a printing method. Thus, a stronger mechanical hold between the sprayed layer and the electrically conductive coating can be achieved than between the electrode and the electrically conductive coating. This is true, in particular for an electrically conductive coating that is implemented as a multilayer system in which the sprayed layer enables a "digging-in" (mechanical connection) with all layers, whereas the electrode not applied in the spraying method is mechanically connected only to the uppermost layer. Accordingly, the sprayed layer is also electrically connected to all layers of the multilayer system, whereas the electrode not applied in the spraying method is electrically connected only to the uppermost layer.

On the other hand, the electrode also has a rather rough or coarse surface such that through the electrode applied on the (also rather rough or coarse) sprayed layer, a particularly good "digging-in" (mechanical and electrical connection) can be achieved. Thus, with a contact composite in which the sprayed layer is applied on the electrically conductive coating and the electrode is applied on the sprayed layer, a particularly good mechanical and electrical connection of both the sprayed layer and the electrode can be obtained such that the contact composite is particularly stable and has good electrical conductivity.

In another advantageous embodiment of the contact composite according to the invention, the sprayed layer has a layer thickness such that the electrode is mechanically reinforced. For this purpose, the layer thickness of the sprayed layer can be, for example, 2 to 50 times as thick as a layer thickness of the electrode. Through this measure, the mechanical strength of the contact composite can be even further improved, wherein, in particular, breakage of the contact composite by detachment of the electrode from the substrate can be effectively counteracted.

In one embodiment of the contact composite, the contact element is not produced by a spraying method and, thus, not implemented as a sprayed layer, but implemented instead in the form of a prefabricated (e.g., one-piece) contact element or contact part and is electrically connected to the electrode as a prefabricated contact element.

In the contact composite according to the invention, the contact element is not a solder such that the contact element per se is solder-free. However, the contact element can, for example, be attached in the contact composite by a lead-containing or lead-free solder. In practice, it has been demonstrated that, in fact, lead-containing solders have high ductility, which is, however, not true of lead-free solders. In the contact composite according to the invention, the sprayed layer can be used particularly advantageously for the improvement of the mechanical stability (ductility) of the contact composite even with the use of lead-free solders, with the contact element being attached to the electrode or to the sprayed layer via a lead-free solder.

In the contact composite according to the invention, the (electrically conductive) sprayed layer comprises at least one metal and/or at least one metal alloy to achieve that the coefficient of thermal expansion of the sprayed layer is between those of the substrate and the contact element. Advantageously, the sprayed layer comprises one or a plurality of metals and/or one or a plurality of metal alloys, selected from silver, copper, gold, aluminum, sodium, tungsten, brass, iron, chromium, lead, bismuth, titanium, tin, zinc, molybdenum, indium, nickel, platinum, vanadium, cobalt, thallium, and niobium. The selection of a suitable metal or metal alloy results substantially from the desired coefficient of thermal expansion, which can be easily and reliably established in this manner.

It can also be advantageous for the sprayed layer to contain at least one additional component made of an electrically insulating material, for example, glass particles, to selectively influence the mechanical properties of the contact composite as well as the coefficient of thermal expansion of the sprayed layer.

According to the invention, another, second contact composite is presented, which differs from the previous contact composite in that the electrode for contacting the electrically conductive coating is replaced by the sprayed layer. Accordingly, the contact composite comprises a flat substrate made, for example, of glass or plastic and an electrically conductive coating applied thereon, as well as a sprayed layer sprayed onto the conductive coating by a thermal spraying method, in particular cold gas spraying. The contact composite further comprises a metal contact element electrically connected to the sprayed layer, which serves for the connection of the conductive coating to an electrical component, for example, a current/voltage source. The material of the sprayed layer has a coefficient of thermal expansion that is between the coefficients of thermal expansion of the materials of the substrate and the contact element. The contact composite can, in principle, be configured in the same manner as the previously described contact composite. To avoid unnecessary repetitions, reference is made to the statements made there.

In such a contact composite, the danger of thermal stresses can be greatly reduced in a particularly advantageous manner by means of the sprayed layer applied on the conductive coating. In addition, the sprayed layer can be connected to the conductive coating with a particularly high adhesive force.

The invention further extends to a flat electrical structure, in particular a panel heating element, for example, a heatable transparent or opaque glazing, or a planar antenna that comprises a flat substrate with an electrically conductive coating, with the flat electrical structure having at least one contact composite as described above.

The invention further extends to a method for producing an electrical contact composite of a flat electrical structure, in particular for producing the above-described first contact composite, which comprises the following steps:

Providing a flat substrate, made, for example, of glass or plastic, with an electrically conductive coating applied thereon;

Producing an electrode electrically connected to the conductive coating;

Producing a metal contact element electrically connected to the electrode, which contact element serves for the connection of the electrode to an electrical component, for example, an electrical circuit or a current/voltage source, current/voltage source;

Producing, by means of the thermal spraying method, in particular cold gas spraying, at least one sprayed layer that comprises at least one metal and/or at least one metal alloy and is arranged between the conductive coating and the contact element, wherein the material of the sprayed layer has a coefficient of thermal expansion that is between the coefficients of thermal expansion of the materials of the substrate and the contact element.

In one embodiment of the method, the sprayed layer is sprayed onto the electrode or the conductive coating, where it can be advantageous from the standpoint of the mechanical properties of the contact composite for the sprayed layer to be sprayed directly onto the electrode.

The invention further extends to a method for producing an electrical contact composite of a flat electric structure, in particular for producing the above-described second contact composite, with the following steps:

Providing a substrate with an electrically conductive coating applied thereon;

Spraying a sprayed layer, by means of a thermal spraying method, in particular cold gas spraying, onto the conductive coating, wherein the sprayed layer comprises at least one metal and/or at least one metal alloy and wherein the material of the sprayed layer has a coefficient of thermal expansion that is between the coefficients of thermal expansion of the materials of the substrate and the contact element;

Producing a metal contact element electrically connected to the sprayed layer for the connection of the conductive coating to an electrical component, for example, an electrical circuit or a current/voltage source.

Moreover, the invention extends to the use of an electrically conductive sprayed layer produced by a thermal spraying method, in particular cold gas spraying, for the reduction of thermal stresses in a contact composite as described above.

Accordingly, the invention extends to the use of an electrically conductive sprayed layer produced by a thermal spraying method, in particular cold gas spraying, for the reduction of thermal stresses between a substrate made, for example, of glass or plastic and an electrically conductive coating contacted by an electrode applied thereon, and a metal contact element electrically connected to the electrode, wherein the material of the sprayed layer has a coefficient of thermal expansion that is between the coefficients of thermal expansion of the materials of the substrate and the contact element.

It likewise extends to the use of an electrically conductive sprayed layer produced by means of a thermal spraying method, in particular cold gas spraying, for the reduction of thermal stresses between a substrate made, for example, of glass or plastic and an electrically conductive coating applied thereon contacted by the sprayed layer, and a metal contact element electrically connected to the sprayed layer, wherein the material of the sprayed layer has a coefficient of thermal expansion that is between the coefficients of thermal expansion of the materials of the substrate and the contact element.

It is understood that the different embodiments of the invention can be realized individually or in any combinations. In particular, the above-mentioned characteristics and those to be explained in the following can be used not only in the combinations indicated but also in other combinations or alone, without departing from the scope of the present invention.

BRIEF DESCRIPTION OF THE DRAWINGS

The invention is now explained in detail using exemplary embodiments, with reference to the accompanying figures. Identical or identically acting components are referenced with the same reference characters. They depict in simplified, not-to-scale representation.

DETAILED DESCRIPTION OF THE INVENTION

Figure 1:
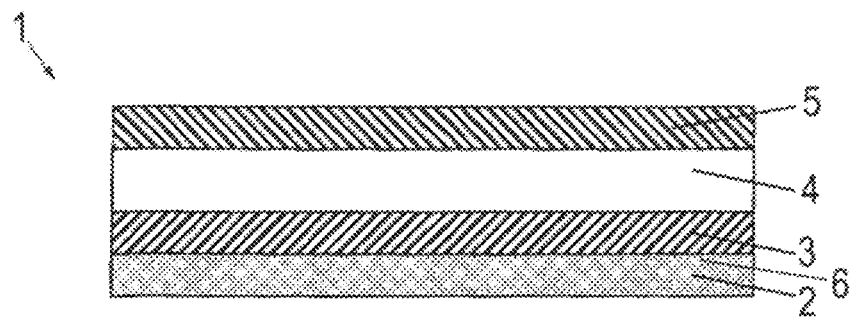
FIG. 1 a schematic cross-sectional view of an exemplary embodiment for an electrical contact composite according to the invention.

FIG. 1 illustrates a contact composite referenced as a whole with the reference number 1, which is part of a flat electrical structure (not further shown). The flat electrical structure can, for example, be a panel heating element, in particular a heatable glazing, or a planar antenna. The heatable glazing can be implemented, for example, in the form of a composite pane in which two individual panes are bonded to each other by a thermoplastic adhesive layer. Likewise, the heatable glazing can be a so-called single-pane security glass that comprises only one individual pane.

The contact composite 1 comprises at least a flat substrate 2 with an electrically conductive coating 6 applied thereon, which is not shown in detail in FIG. 1. As used here, the term "substrate" refers, for example, to a single pane (carrier) of a composite pane or a single pane glass or to the carrier of a planar antenna.

The substrate 2 is made, for example, of a glass material, such as float glass, quartz glass, borosilicate glass, soda lime glass, cast glass, or ceramic glass, or made of a nonglass material, for example, plastic, such as polystyrene (PS), polyamide (PA), polyester (PE), polyvinyl chloride (PVC), polycarbonate (PC), polymethyl methacrylate (PMA), or polyethylene terephthalate (PET) and/or mixtures thereof. Examples of suitable glasses can be found in particular in the European patent EP 0847965 B1. In general, any material with adequate chemical resistance, suitable shape and size stability, as well as, as the case may be, adequate optical transparency, can be used.

Depending on the application, the thickness of the substrate 2 can vary widely. For a heatable, transparent glazing, the thickness of the substrate 2 is, for example, in the range from 1 to 25 mm, whereas, typically, for transparent panes, a thickness from 1.4 to 2.1 mm is used. The substrate 2 is planar or bent in one or a plurality of spatial directions.

The substrate 2 can, for example, be coated substantially over the full surface with the conductive coating 6 (extent of coating, e.g., 90%). The conductive coating 6 can, in particular, be a transparent coating that is transparent to the electromagnetic radiation, preferably electromagnetic radiation of a wavelength from 300 to 1300 nm, in particular to visible light. The term "transparent" refers here to a total transmittance of the flat electrical structure that is, in particular for visible light, for example, >70% and in particular >80%. Transparent conductive coatings 6 are known, for example, from the printed publications DE 202008017611 U1 and EP 0847965 B1.

The conductive coating 6 includes an electrically conductive material, typically a metal or metal oxide. Examples of this are metals with a high electrical conductivity such as silver (Ag), copper (Cu), gold (Au), aluminum (Al), or molybdenum (Mo), metal alloys such as silver (Ag) alloyed with palladium (Pa), as well as transparent, conductive oxides (TCOs). TCOs are preferably indium tin oxide, fluoride-doped tin dioxide, aluminum-doped tin dioxide, gallium-doped tin dioxide, boron-doped tin dioxide, tin zinc oxide, or antimony-doped tin oxide. For example, the conductive coating 6 consists of a metal metal layer such as a silver layer or a silver-containing metal alloy that is embedded between at least two coatings made of dielectric material of the metal oxide type. The metal oxide includes, for example, zinc oxide, tin oxide, indium oxide, titanium oxide, silicon oxide, aluminum oxide, or the like, as well as combinations of one or a plurality thereof. The dielectric material can also contain silicon nitride, silicon carbide, or aluminum nitride. For example, metal layer systems with a plurality of metal layers are used, with the individual metal layers separated by at least one layer made of a dielectric material. Very fine metal layers that contain, in particular, titanium or niobium can also be provided on both sides of a silver layer. The bottom metal layer serves as an adhesion and crystallization layer. The top metal layer serves as a protection and getter layer to prevent a modification of the silver during the further process steps. Advantageously, the layer sequence has high thermal stability such that it withstands the temperatures of typically more than 600° C. necessary for the bending of glass panes without damage; however, even layer sequences with low thermal stability can be provided. In general, the conductive coating 6 is not restricted to a specific material so long as the desired effect, for example, an extensive, electrical heating of the substrate 2 can be obtained with this material.

Such a layer construction is typically obtained by a succession of deposition procedures. The conductive coating 6 is, for example, deposited out of the gas phase directly onto the substrate 2, for which purpose a method known per se, such as chemical vapor deposition (CVD) or physical vapor deposition (PVD), can be used. Preferably, the conductive coating 6 is deposited on the substrate 2 by sputtering (magnetron cathode sputtering). However, it is also conceivable to apply the conductive coating 6 first on a plastic film, in particular PET film (PET=polyethylene terephthalate), which is then adhesively bonded to the substrate 2.

The conductive coating 6 has, for example, a sheet resistance in the range from 1 ohm/square to 10 ohm/square, in particular in the range from 1 ohm/square to 5 ohm/square.

The thickness of the conductive coating 6 can vary widely and be adapted to the requirements of the individual case. It is essential that in a transparent flat electrical structure, the thickness of the conductive coating 6 must not be so great that it becomes impermeable to electromagnetic radiation, preferably electromagnetic radiation of a wavelength of 300 to 1300 nm and, in particular, visible light. For example, the thickness of the conductive coating 6 is at any point in the range from 30 nm to 100 μm. In the case of TCOs, the layer thickness is, for example, in the range from 100 nm to 1.5 μm, preferably in the range from 150 nm to 1 μm and more preferably in the range from 200 nm to 500 nm.

In the contact composite 1, the electrode 3 is, for example, implemented in the form of a band-shaped or strip-shaped bus bar, which is produced by printing, for example, by screen printing, onto the conductive coating 6. Alternatively, it would also be possible to prefabricate the electrode 3 as a metal element, for example, as a metal strip or metal wire which is then electrically connected by a solder or an electrically conductive plastic to the conductive coating 6. A metal such as silver (Ag), in particular in the form of a printing paste for use in the printing method, copper (Cu), aluminum (Al), tungsten (W), and zinc (Zn), or a metal alloy can, for example, be used as electrode material, with this list not being exhaustive. For example, the printing paste includes silver particles and glass frits.

For an electrode 3, made, for example from silver (Ag), which is produced in the printing method, the layer thickness is, for example, in the range from 2 to 25 microns (μm), in particular in the range from 10 to 15 μm. The specific electrical resistance of the electrode 3 depends, in general, on the material used, being in particular for a printed electrode 3 in the range from 2 to 4 micro ohms·centimeter (μohm·cm). For example, the specific electrical resistance of an 80% silver printing paste for the screen printing method is 2.8 μohm·cm. Compared to the high-impedance conductive coating 6, the electrode 3 has relatively low impedance, with the electrical resistance, for example, in the range from 0.15 to 4 ohm/meter (Ω/m). By means of this measure, it it can be achieved that the heating voltage applied drops substantially over the conductive coating 6 such that the electrode 3 heats up only slightly during operation and a very small share of the available heating output on the electrode 3 is given off as power dissipation.

As already stated, the electrode 3 can be produced by printing a metal printing paste onto the conductive coating 6.

Alternatively, it is also possible for a thin metal foil strip that contains, for example, copper and/or aluminum to be used as electrode 3. For example, an electrical contact between the metal foil strip and the conductive coating 6 can be obtained by an autoclave process through the action of heat and pressure. The electrical contact can, however, also be produced by soldering or gluing with an electrically conductive adhesive.

The contact composite 1 further comprises a cold sprayed layer 4 sprayed directly onto the electrode 3 in the cold gas spray method. The cold sprayed layer 4 is made here from a metal material, in particular an elementary metal or a metal alloy, for example, selected from silver (Ag), copper (Cu), gold (Au), aluminum (Al), sodium (Na), tungsten (W), brass, iron (Fe), chromium (Cr), lead (Pb), bismuth (Bi), titanium (Ti), tin (Sn), zinc (Zn), molybdenum (Mo), indium (In), nickel (Ni), platinum (Pt), vanadium (Va), cobalt (Co), thallium (Th), and niobium (Ni).

The layer thickness of the cold sprayed layer 4 can vary widely and is, for example, in the range from 10 to 500 µm, in particular in the range from 20 to 100 µm. Advantageously, the layer thickness of the cold sprayed layer 4 is at least twice as great as the layer thickness of the electrode 3, in order to obtain a good mechanical reinforcement of the electrode 3, in particular if it is implemented relatively thin.

In contact composite 1, a metal contact element 5 is applied on the cold sprayed layer 4, which contact element serves for the connection of the conductive coating 6 to an electrical component, for example, a current/voltage source (not shown). Here, the contact element 5 is implemented, for example, in the form of a prefabricated metal element, for example, a metal strip that is fixedly connected to the cold sprayed layer 4 via a leadfree or lead-containing solder or a conductive adhesive (not depicted in detail). The metal strip 4 is made, for example, of aluminum (Al) or copper (Cu) and has a thickness that is, for example, in the range from 50 to 200 µm. Alternatively, the contact element 5 could also be connected to the cold sprayed layer 4 by pressing or ultrasonic welding. It would also be conceivable to implement the contact element 5 as a spring contact that bears on the cold sprayed layer 4 with a certain spring preload.

In the contact composite 1, the coefficient of thermal expansion of the material of the contact element 5 is typically greater than the coefficient of thermal expansion of the material of the substrate 2. For example, the coefficient of thermal expansion of a glass substrate 2 is in the range from ca. 7 to 7.5($\times 10^{-6}$ K$^{-1}$), whereas the coefficient of thermal expansion for a contact element 5 made of aluminum or copper is in the range from ca. 16 to 17($\times 10^{-6}$ K$^{-1}$).

The cold sprayed layer 4 is made of a material whose coefficient of thermal expansion is between those of the material of the substrate 2 and the contact element 5. In the case of a glass substrate 2 and a metal contact element 5, the coefficient of thermal expansion is preferably in the range from 12 to 13($\times 10^{-6}$ K$^{-1}$). For example, the cold sprayed layer 7 is, for this purpose, produced from titanium (Ti).

By means of the cold sprayed layer 4 arranged between the conductive coating 6 and the metal contact element 5, the possible occurrence of thermal stresses in the contact composite 1 at the time of large temperature changes can be effectively counteracted. Since the cold sprayed layer 4 is sprayed directly onto the electrode 3, a particularly stable connection between the electrode 3 and the cold sprayed layer 4 can also be achieved. The danger of breakage of the contact composite 1 due to thermal stresses can thus be significantly reduced.

Figure 2:
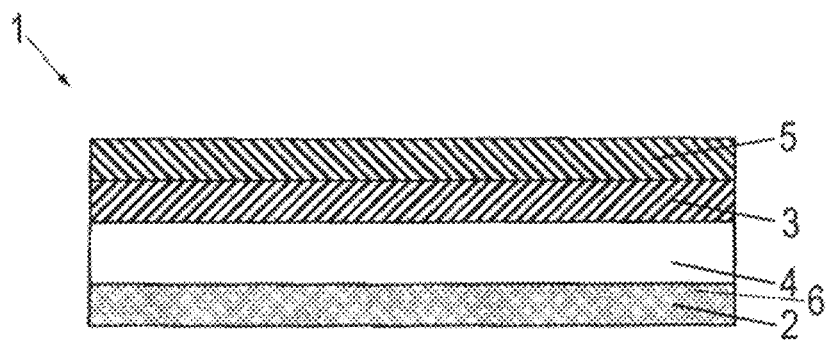
FIG. 2 a schematic cross-sectional view of a variant of the electrical contact composite of FIG. 1.

FIG. 2 depicts another exemplary embodiment for a contact composite 1 according to the invention that presents a variant to the contact composite 1 of FIG. 1. To avoid unnecessary repetitions, only the differences relative to the contact composite of FIG. 1 are explained and, otherwise, reference is made to the statements made there. Accordingly, the cold sprayed layer 4 is sprayed directly onto the conductive coating 6, with the electrode 3 applied on the cold sprayed layer 4 and contacted by the metal contact element 5. This contact composite 1 is distinguished by a particularly stable connection between the cold sprayed layer 4 and the conductive coating 6 in addition to the effect of a reduction of thermal stresses.

Figure 3:
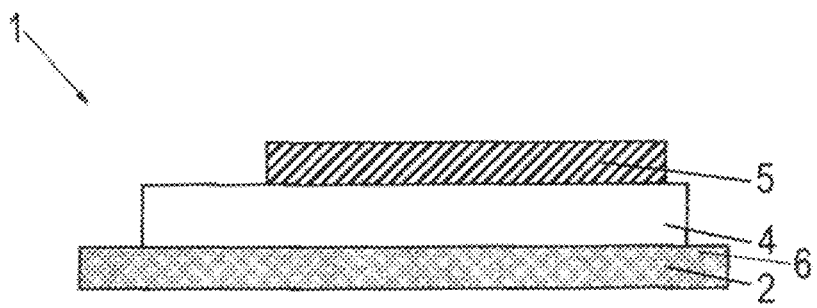
FIG. 3 a schematic cross-sectional view of another variant of the electrical contact composite of FIG. 1.

FIG. 3 depicts another exemplary embodiment for a contact composite according to the invention that presents another variant to the contact composite 1 of FIG. 1. To avoid unnecessary repetitions, again, only the differences relative to the contact composite of FIG. 1 are explained and, otherwise, reference is made to the statements made there. Accordingly, the cold sprayed layer 4 serves as an electrode for the conductive coating 6 and is, for this purpose, sprayed directly onto the conductive coating 6. It is thus possible to do without an electrode different from the cold sprayed layer 4 for the introduction of the heating current into the conductive coating 6. This contact composite 1 also is distinguished by a particularly stable connection between the cold sprayed layer 4 and conductive coating 6 in addition to the effect of a reduction of thermal stresses, with the production of the contact composite 1 also simplified compared to the contact composite 1 of FIG. 1 or FIG. 2, since no separate electrode 3 is required.

The present invention makes available a contact composite for a flat electrical structure, for example, a panel heating element or a planar antenna, in which, by means of a sprayed layer that is arranged between the substrate and the contact element, a reduction in the difference of the coefficients of thermal expansion of the adjacent components of the contact composite can be achieved. The occurrence of thermal stresses can thus be effectively counteracted. In addition, the ductility of the contact composite is significantly improved. The danger of breakage of the contact composite due to thermal stresses can be clearly reduced.

REFERENCE LIST 1 contact composite
2 substrate
3 electrode
4 cold sprayed layer
5 contact element
6 conductive coating

What is claimed is:

1. An electrical contact composite, comprising, in order:
   a flat substrate with an electrically conductive coating applied thereon,
   an electrode that is electrically connected to the conductive coating and mechanically connected to the conductive coating by way of a printing method,
   a sprayed layer that is produced by a thermal spraying method onto the electrode,
   a solder layer; and
   a metal contact element that is electrically connected to the electrode and mechanically connected to the sprayed layer by way of the solder layer, the metal contact element serving for electrical connection of the conductive coating to an electrical component,
   wherein said sprayed layer comprises at least one metal and/or at least one metal alloy, and
   wherein the sprayed layer contains at least one electrically insulating material.

2. The contact composite according to claim 1, wherein a coefficient of thermal expansion of the sprayed layer is in a range of a middle third of a value range for coefficients of thermal expansion bounded by coefficients of thermal expansion of the flat substrate and the contact element.

3. The contact composite according to claim 2, wherein the coefficient of thermal expansion of the sprayed layer corresponds at least approximately to a mean value formed from the coefficients of thermal expansion of the flat substrate and the contact element.

4. The contact composite according to claim 1, wherein the sprayed layer has a layer thickness 2 to 50 times that of the electrode.

5. The contact composite according to claim 1, wherein the sprayed layer comprises one or a plurality of metals and/or metal alloys, selected from silver, copper, gold, aluminum, sodium, tungsten, brass, iron, chromium, lead, bismuth, titanium, tin, zinc, molybdenum, indium, nickel, platinum, vanadium, cobalt, thallium, and niobium.

6. An electrical structure with a flat substrate and an electrically conductive coating applied on the flat substrate, the electrical structure comprising at least one electrical contact composite according to claim 1.

* * * * *